United States Patent [19]

Simone et al.

[11] 4,251,378
[45] Feb. 17, 1981

[54] GRAVITY SETTLING

[75] Inventors: Andre A. Simone, Denville; Dennis F. Ogren, Verona; William R. Adams, Upper Montclair; Harold B. Kohn, Cedar Grove, all of N.J.

[73] Assignee: The Lummus Company, Bloomfield, N.J.

[21] Appl. No.: 80,418

[22] Filed: Oct. 1, 1979

Related U.S. Application Data

[62] Division of Ser. No. 959,646, Nov. 13, 1978, Pat. No. 4,196,080.

[51] Int. Cl.³ .............................................. B01D 21/10
[52] U.S. Cl. ..................................................... 210/522
[58] Field of Search ................... 210/83, 84, 521, 522, 210/532-536, 540

[56] References Cited

U.S. PATENT DOCUMENTS

| 2,793,186 | 5/1957 | Dunell | 210/521 |
|---|---|---|---|
| 3,718,257 | 2/1973 | Bach | 210/521 |
| 3,813,851 | 6/1974 | Eder | 210/521 |
| 3,962,098 | 6/1978 | Sze | 210/84 |
| 4,028,249 | 6/1977 | McGivern | 210/83 |

Primary Examiner—Ernest G. Therkorn
Attorney, Agent, or Firm—Louis E. Marn; Elliot M. Olstein

[57] ABSTRACT

A gravity settler comprised of a housing which encloses a plurality of conically shaped hollow members arranged in vertically spaced horizontally disposed layers, each of such layers containing a plurality of the conical members, with adjacent layers defining therebetween separate gravity settling compartments. Each of the compartments includes a feed inlet(s), overflow outlets for withdrawing clarified liquid and underflow outlets for withdrawing liquid containing solid.

6 Claims, 1 Drawing Figure

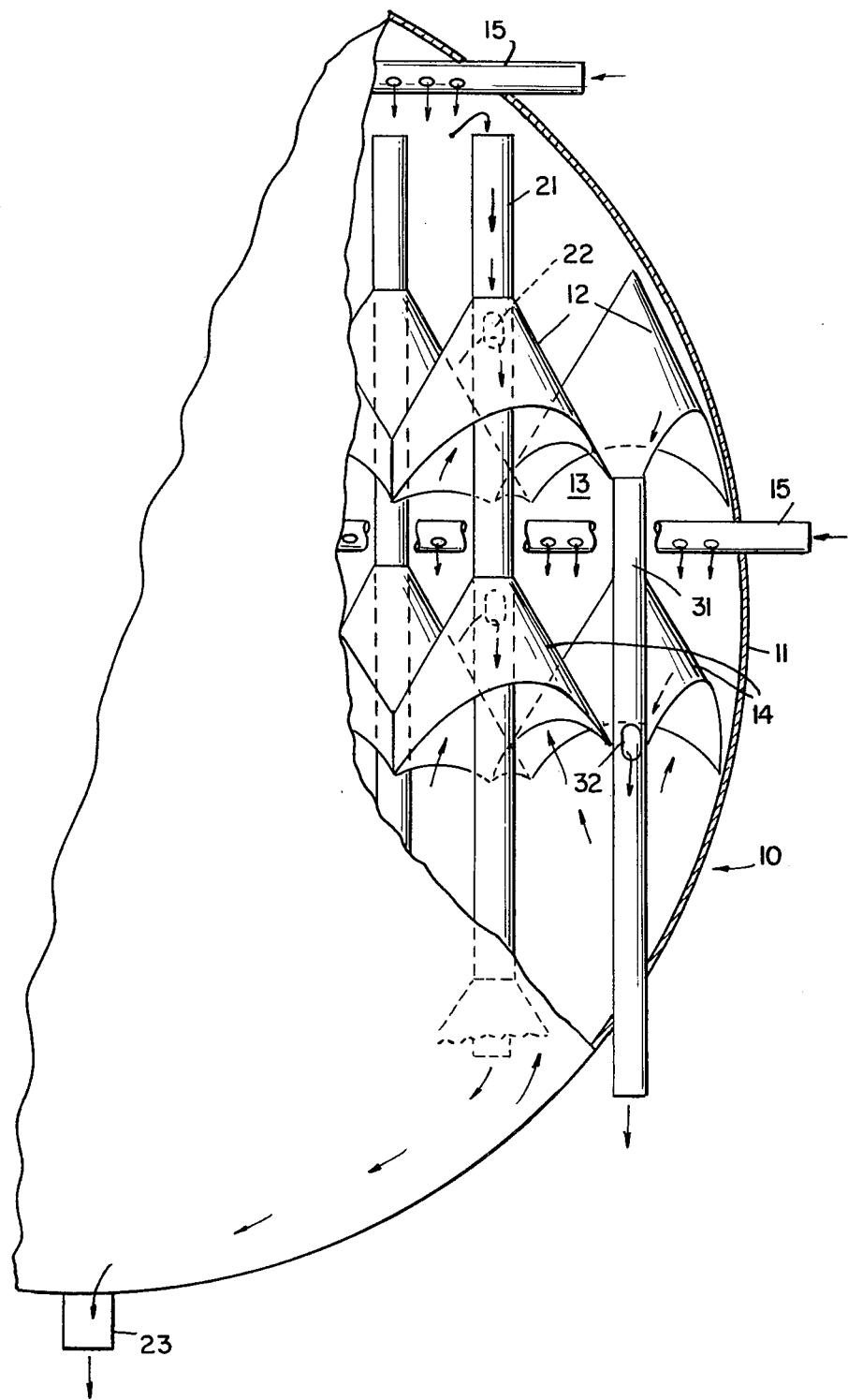

GRAVITY SETTLING

This is a division of application Ser. No. 959,646, filed Nov. 13, 1978, now U.S. Pat. No. 4,196,080.

This invention relates to liquid-solid separation, and more particularly to liquid-solid separation by gravity separation. Still more particularly, this invention relates to a new and improved process and apparatus for separating solids from a coal liquefaction product.

In many processes, there is a need for efficiently effecting liquid-solid separation by gravity settling. Thus, for example, in the liquefaction of coal, the coal liquefaction product includes a mixture of coal extract and undissolved coal residue, including undissolved extractable carbonaceous matter, fusain and mineral matter or ash. The finely divided undissolved coal residue must be separated from the coal extract, and the difficulties encountered in such a separation has been the principal drawback to the successful commercial operation of a coal extraction process. Recently, there has been proposed a process for effecting such separation by gravity settling, and in many cases, it is preferred to effect such gravity settling at an elevated pressure.

Accordingly, there is a need for improved apparatus for effecting liquid-solid separation by gravity settling.

An object of the present invention is to provide an improved apparatus for effecting liquid-solid separation.

Another object of the present invention is to provide a new and improved gravity settler.

A further object of the present invention is to provide for separation of insoluble material from a coal liquefaction product by gravity settling.

These and other objects of the present invention should become apparent from reading the following description thereof.

In accordance with the present invention, there is provided a gravity settler comprised of a housing, preferably an ellipsoidally or spherically shaped housing, which encloses a plurality of hollow conically shaped member. The conically shaped members are arranged in a plurality of vertically spaced layers, with each of the layers having a plurality of the conically shaped members with the base of the members being disposed in a horizontal direction. Adjacent layers of conical members define therebetween separate gravity settling compartments, and each of the compartments is provided with a feed inlet means (one or more feed inlets) for introducing liquid containing solids, an overflow outlet means in the upper portion of the compartment for withdrawing clarified liquid and an underflow outlet means in the lower portion of the compartment for withdrawing liquid containing solids. The walls of the conically shaped members are sloped, with respect to horizontal, at an angle of at least 45° and less than 90°, with the angle preferably being at least 55° and also preferably no greater than 70°.

In accordance with a preferred aspect of the present invention, a coal liquefaction product, comprised of a liquid coal extract of dissolved carbonaceous matter in a coal liquefaction solvent and insoluble material (ash and unreacted coal), preferably in admixture with a liquid promoter, as hereinafter described, is introduced into a gravity settler of the type hereinabove described, to recover, as overflow, a coal extract essentially free of solids, and as underflow, a stream containing the insoluble material.

The liquid promoter which is employed to enhance and promote the separation of insoluble material from the coat liquefaction product is generally a hydrocarbon liquid having a characterization factor (K) of at least about 9.75 and preferably at least about 11.0 wherein:

$$K = \frac{\sqrt[3]{T_B}}{G}$$

wherein $T_B$ is the molal average boiling point of the liquid (°R); and G is specific gravity of the liquid (60° F./60° F.).

The characterization factor is an index of the aromaticity/parafinicity of hydrocarbons and petroleum fractions as disclosed by Watson and Nelson, Ind. Eng. Chem 25,880 (1933), with more parafinic materials having higher values for the characterization factor (K). The promoter liquid which is employed is one which has a characterization factor (K) in excess of 9.75 and which is also less aromatic than the liquefaction solvent; i.e., the characterization factor (K) of the promoter liquid has a value which is generally at least 0.25 higher than the characterization factor of the liquefaction solvent.

The liquid which is used to enhance and promote the separation of insoluble material is further characterized by a 5 volume percent distillation temperature of at least about 250° F. and a 95 volume percent distillation temperature of at least about 350° F. and no greater than about 750° F. The promoter liquid preferably has a 5 volume percent distillation temperature of at least about 310° F. and most preferably of at least about 400° F. The 95 volume percent distillation temperature is preferably no greater than about 600° F. The most preferred promoter liquid has a 95 volume percent distillation temperature of no greater than about 500° F. It is to be understood that the promoter liquid may be a hydrocarbon; e.g., tetrahydronaphthalene, in which case the 5 volume percent and 95 volume percent distillation temperatures are the same; i.e., the hydrocarbon has a single boiling point. In such a case, the boiling point of the hydrocarbon must be at least about 350° F. in order to meet the requirements of a 5 volume percent distillation temperature of at least about 250° F. and a 95 volume percent distillation temperature of at least about 350° F. The promoter liquid is preferably a blend mixture of hydrocarbons in which case the 5 volume percent and 95 volume percent distillation temperatures are not the same.

The 5 volume and 95 volume percent distillation temperature may be conveniently determined by ASTM No. D 86-67 or No. D 1160 with the former being preferred for those liquids having a 95% volume distillation temperature of below 600° F. The methods for determining such temperatures are well known in the art and further details in this respect are not required for a full understanding of the invention. It is also to be understood that the reported temperatures are corrected to atmospheric pressure.

As representative examples of such liquids, there may be mentioned: kerosene or kerosene fractions from paraffinic or mixed base crude oils; middle distillates, light gas oils and gas oil fractions from paraffinic or mixed based crude oils; alkyl benzenes with side chains containing ten or more carbon atoms; paraffinic hydrocarbons containing more than twelve carbon atoms; white oils or white oil fractions derived from crude oils; alphaolefins containing more than twelve carbon atoms; fully hydrogenated naphthalenes and substituted naphthalenes; propylene oligomers (pentamer and higher); tetrahydronaphthalene, heavy naphtha fractions, etc. The most preferred liquids are kerosene fractions; white oils; fully hydrogenated naphthalenes and substituted naphthalenes; and tetrahydronaphthalene.

The amount of liquid promoter used for enhancing and promoting the separation of insoluble matter from the coal liquefaction product will vary with the particular liquid employed, the coal liquefaction solvent, the coal used as starting material and the manner in which the liquefaction is effected. As should be apparent to those skilled in the art, the amount of liquid promoter used should be minimized in order to reduce the overall costs of the process. It has been found that by using the liquid of controlled aromaticity, in accordance with the teachings of the present invention, the desired separation of insoluble material may be effected with modest amounts of liquid promoter. In general, the weight ratio of liquid promoter to coal solution may range from about 0.2:1 to about 3.0:1, preferably from about 0.3:1 to about 2.0:1 and, most preferably from about 0.3:1 to about 1.5:1. In using the preferred promoter liquid which is kerosene fraction having 5% and 95% volume distillation temperatures of 425° F., and 500° F., respectively, promoter liquid to coal solution weight ratios in the order of 0.4:1 to 0.6:1 have been particularly successful. It is to be understood, however, that greater amounts of liquid promoter may be employed but the use of such greater amounts is uneconomical. In addition, the use of an excess of liquid promoter may result in the precipitation or separation of an excessive amount of desired coal derived products from the coal extract. More particularly, as the amount of liquid promoter employed is increased, a greater amount of ash is separated from the coal solution, but such increased ash separation is accompanied by an increased separation of desired coal derived products from the coal solution. By using the liquid promoters as herein described, not only may modest amounts of solvent be employed, but, in addtion, ash may be effectively separated from the coal solution; e.g., in amounts greater than 90%, without an excessive loss of desired coal derived products.

In addition, the net coal product (the extracted carbonaceous matter, excluding promoter liquid, liquefaction solvent and gas make), hereinafter sometimes referred to as "coal product", contains less than about 0.5% insoluble material, all by weight. The specific amount of insoluble material which is permitted to be present in the coal product is dependent upon the product standards, and the deashing is controlled in order to provide the required specifications. Based on an Illinois type coal, the production of a coal product having less than 0.05%, by weight, insoluble material, corresponds to 99.8 +% ash removal; however, as should be apparent, the percent ash removal required to provide a coal product having the required minimum amount of insoluble material is dependent upon the initial ash content of the coal. Thus, the liquid promoter is added to the coal solution in an amount, as hereinabove described, to provide a coal product in which insoluble material is present in an amount of less than about 0.05%, by weight.

The liquid promoter may also be prepared by blending a material having a characterization factor below 9.75 with a material having a characterization factor above 9.75 and the boiling properties, as hereinabove described. The use of blended materials is a convenient manner of regulating the characterization factor.

The use of a liquid promoter for enhancing separation of insoluble material from a coal liquefaction product is described in detail in U.S. application Ser. No. 304,319, filed on Nov. 7, 1972, and hereby incorporated by reference.

The gravity settling is generally effected at a temperature from 300° F. to about 600° F., preferably from 350° F. to 550° F., at a pressure from about 0 psig, preferably at least 30 psig, and up to about 500 psig, preferably at a pressure from about 30 psig to 150 psig. It is to be understood that higher pressures could be employed, but in general lower pressures are preferred.

The invention will be further described with respect to the accompanying drawings wherein:

The drawing is a partial broken isometric of an embodiment of the present invention.

Referring to the drawing, there is shown a gravity settling apparatus 10, comprised of a housing 11, in the form of a sphere, as particularly shown, which encloses a plurality of hollow, open conically shaped members 12. The conically shaped members 12 are arranged in vertically spaced layers, with each layer containing a plurality of conically shaped members 12.

The conically shaped members of each layer are arranged with their apex in a vertical direction and the base positioned below the apex, with the bases of the cones of a layer being in a single horizontal plane. The base of each cone in a layer intersects with a portion of the base of the adjacent cones in the layer. The walls of the conical members 12 define an angle of at least 45° with the horizontal.

The conical members 12 of one horizontal layer are postioned above and in alignment with the corresponding conical members 12 of the next lower layer. The conical members of adjacent layers define therebetween a liquid-solids separation compartment or chamber 13, with the outer surfaces 14 of the conical members of the lower layer defining solid-intercepting surfaces for settled solids.

Each of the chambers 13 is provided with a feed inlet means for the introduction of liquid-solid feed with the feed inlet means being particularly shown as an apertured inlet pipe 15 which extends across the chamber. The apertured inlet pipe 55 may be provided with suitable branches (not shown) to provide for distribution throughout the chamber. As should be apparent more than one pipe may be employed.

Each of the compartments 13 is provided with an overflow outlet means for withdrawing clarified liquid. As particularly shown, such overflow outlet means is comprised of a plurality of liquid outlet pipes 21 positioned at the apexes of each of the conical members 12 for withdrawing essentially solid free liquid from the uppermost portions of each of the compartments 13. As particularly shown, vertically aligned conical members 12 are provided with a single outlet pipe 21 which extends through the apexes of vertically aligned conical members, with the outlet pipe 21 including suitable apertures 22 for receiving the clarified liquid from the top portion of the interior of the conical member 12. As particularly shown, the outlet pipes 21 discharge into the bottom of the vessel 11 below the lowest layer of conical members 12, with the clarified liquid being withdrawn from vessel 11 through outlet pipe 23.

As particularly shown, the portion of vessel 11 above the top layer of conical members 12 is also provided with a liquid-solid inlet pipe 15 whereby a liquid-solid separation chamber 13 is formed between the top layer of conical members 12 and the top of vessel 11. The clarified liquid outlet pipes 21 extend into the top chamber 13 for withdrawing clarified liquid therefrom.

Each of the compartments 13 is provided with underflow outlet means for withdrawing solid-containing liquid. As particularly shown, such underflow outlet means is comprised of a plurality of underflow outlet pipes 31 which are positioned to receive liquid containing solids from the lowest portions of each of the compartments 13; i.e., the outlet pipes 31 are positioned to receive liquid containing solids at the bases of the exterior surfaces of the conical members 12. The portions of the bases of conical members which are adjacent to each other in a layer thereof are connected to an outlet pipe 31, with the outlet pipe extending vertically through the vertical layers whereby the corresponding portions of the conical members 12 in each vertically spaced layer are connected to a single outlet pipe 31. In this manner, the outlet pipes 31 also function as support columns for the conical members 12. The outlet pipes 31 are provided with suitable inlets 32 for receiving the liquid containing solids from the base portion of the compartments. The outlet pipes 31 are suitably connected to the vessel 11 for effecting support of the conical members 12 and extend therethrough for effecting withdrawal of the solid containing underflow.

The conical members are preferably arranged so that vertically spaced compartments 13 are completely separated from each other, although such an arrangement is not required. Of course, in the embodiment illustrated, the lower portion of the vessel into which clarified liquid is passed should be completely separated from the compartments in which the separation is effected.

Although the invention has been particularly described with respect to a preferred embodiment thereof, the scope of the invention is not to be limited thereby. Thus, for example, clarified liquid may be withdrawn in a manner other than as particularly described. For example, separate oulet pipes can be provided for each conical member instead of using common pipes for vertically aligned vessels. Similarly, the overflow may be withdrawn upwardly, rather than downwardly as described.

Similarly, the underflow withdrawal may be effected otherwise than as particularly described. For example, withdrawal could be effected other than through common pipes for the vertically aligned portions of the conical members.

As a further alternative, vessel 11 may be in the form of a cylinder.

These and other modifications should be apparent to those skilled in the art from the teachings herein.

The use of the gravity settling vessel of the present invention is particularly advantageous, as compared to a single cone in sphere of the type described in U.S. Pat. No. 3,962,098, in that shorter underflow times can be achieved for a given throughput. In addition, there is a larger interfacial surface area per unit volume which enhances the gravity settling.

Numberous modifications and variations of the present invention are possible in light of the above teachings and, therefore, within the scope of the appended claims, the invention may be practised otherwise than as particularly described.

What is claimed is:

1. A gravity settling apparatus, comprising:
   a housing;
   a plurality of vertically spaced separate single gravity settling stages defined between a plurality of vertically spaced horizontal layers arranged in the housing, each layer comprising a plurality of hollow conically shaped members, said conically shaped members having their axes positioned substantially vertical, with the apexes above the base;
   fresh feed inlet means for separately introducing fresh feed liquid containing solids into each of said vertically spaced separate gravity settling stages;
   overflow outlet means for withdrawing clarified liquid from the uppermost portions of each of said vertically spaced separate gravity settling stages; and
   underflow outlet means for withdrawing liquid containing solids from the lowermost portions of each of said separate gravity settling stages, each of said single gravity settling stages being effective to provide for essential completion of gravity settling therein.

2. The apparatus of claim 1 wherein the overflow outlet means is comprised of a plurality of overflow outlet pipes positioned in the apexes of said conically shaped members.

3. The apparatus of claim 2 wherein the underflow outlet means is comprised of a plurality of underflow outlet pipes positioned at the bases of said conically shaped members.

4. The apparatus of claim 3 wherein a portion of the bases of the conically shaped members of a horizontal layer which are adjacent to each other are connected to one underflow outlet pipe.

5. The apparatus of claim 1 wherein the housing has an ellipsoidal shape.

6. The apparatus of claim 1 wherein the housing is in the shape of a sphere.

* * * * *